(12) United States Patent
Ohtsuka

(10) Patent No.: US 11,107,441 B2
(45) Date of Patent: Aug. 31, 2021

(54) IMAGE ADJUSTMENT DEVICE, IMAGE ADJUSTMENT METHOD, AND COMPUTER READABLE MEDIUM

(71) Applicant: Sakuichi Ohtsuka, Kagoshima (JP)

(72) Inventor: Sakuichi Ohtsuka, Kagoshima (JP)

(73) Assignee: Sakuichi Ohtsuka, Kagoshima (JP)

( * ) Notice: Subject to any disclaimer, the term of this patent is extended or adjusted under 35 U.S.C. 154(b) by 62 days.

(21) Appl. No.: 16/613,740

(22) PCT Filed: May 16, 2018

(86) PCT No.: PCT/JP2018/018861
§ 371 (c)(1),
(2) Date: Nov. 14, 2019

(87) PCT Pub. No.: WO2018/212212
PCT Pub. Date: Nov. 22, 2018

(65) Prior Publication Data
US 2021/0174763 A1    Jun. 10, 2021

(30) Foreign Application Priority Data

May 18, 2017  (JP) .............................. JP2017-099165

(51) Int. Cl.
*G09G 5/10* (2006.01)

(52) U.S. Cl.
CPC ....... *G09G 5/10* (2013.01); *G09G 2320/0626* (2013.01); *G09G 2354/00* (2013.01); *G09G 2360/144* (2013.01)

(58) Field of Classification Search
CPC ..... G09G 2360/144; G09G 2320/0626; G09G 2320/0673; G09G 2320/0276
See application file for complete search history.

(56) References Cited

U.S. PATENT DOCUMENTS

| 2011/0050934 A1 | 3/2011 | Mitsunaga |
| 2013/0155330 A1 | 6/2013 | Longhurst et al. |

FOREIGN PATENT DOCUMENTS

| CN | 104902141 A | * | 9/2015 | ............. H04N 5/202 |
| JP | 2006215756 A |   | 8/2006 | |

(Continued)

OTHER PUBLICATIONS

Mantiuk et al., Display Adaptive Tone Mapping, Proc. ACMSIGGRAPH, 2008, Art. No. 68, ISBN: 978-1-4503-0112-1.

(Continued)

*Primary Examiner* — Priyank J Shah
(74) *Attorney, Agent, or Firm* — K&L Gates LLP; Louis C. Cullman; Dennis A. Majewski

(57) ABSTRACT

A tone adjustment unit assumes that the following relationship is satisfied: $L_O = D_O + Da = TD(I) + Da = TL(I)$, in which I represents a luminance value normalized to have a maximum value of one in first image data, $D_O$ represents a luminance value normalized to have a maximum value of one in second image data, Da represents a luminance value under ambient light during viewing, $L_O$ represents a luminance value of the second image data while taking into consideration effects of the ambient light during viewing, TD(I) represents a tone curve used for conversion, and TL(I) represents a tone curve taking into consideration the environment. The tone curve TD(I) is adjusted so that a function representing an inclination γ(I) after converting $L_O = TL(I)$ to a double logarithmic plot is non-zero over an entire dynamic range.

14 Claims, 16 Drawing Sheets

(56) References Cited

FOREIGN PATENT DOCUMENTS

| | | |
|---|---|---|
| JP | 2009177558 A | 8/2009 |
| WO | 2018/212212 A1 | 11/2018 |

OTHER PUBLICATIONS

International Search Report and Written Opinion for PCT/JP2018/018861 dated Aug. 7, 2018.

\* cited by examiner

IMAGE ADJUSTMENT DEVICE, IMAGE ADJUSTMENT METHOD, AND COMPUTER READABLE MEDIUM

PRIORITY CLAIM

This application is a national phase entry of PCT/JP2018/018861, filed May 16, 2018, which claims priority to Japanese Patent Application No. 2017-099165, filed on May 18, 2017, the entire disclosures of which are incorporated by reference herein.

TECHNICAL FIELD

The present disclosure relates to an image adjustment device, an image adjustment method, and a computer readable medium.

BACKGROUND ART

Dynamic range refers to a width, that is, a ratio, of a maximum value to a minimum value of luminance in an image. Recently capturing an image having a wide dynamic range is possible, and such an image is termed a high dynamic range (HDR) image. The dynamic range of the HDR image, for example, is 6,000:1 (1/6,000), and the luminance value is expressed as a 16 bit value, for example.

In contrast, an image having a dynamic range of a width capable of being represented on a normal display is termed a standard dynamic range (SDR) image. The dynamic range of the SDR image, for example, is 20:1 (1/20), and the luminance value is expressed as an 8 bit value, for example.

With the development of devices such as mobile devices, recently demand increases for the use of an SDR display of the device in a bright environment to view an HDR image such as a movie created on the premise that the image is to be viewed using an HDR display in a dark room. Thus devices such as image processing devices are being developed that, from an inputted HDR image, generate an image capable of display within a luminance range that is representable by a display screen (for example, see Patent Literature 1).

CITATION LIST

Patent Literature

Patent Literature 1: Unexamined Japanese Patent Application Kokai Publication No. 2006-215756

SUMMARY OF INVENTION

Technical Problem

Tone mapping of an image includes global mapping that performs tone mapping by use of the same tone curve for an entire image and partial mapping that performs tone mapping that differs from part to part by use of characteristics of parts of the image. The inventors of the present disclosure discovered that humans are aware of, and distinguish, luminance of an entire image, except for special conditions of a part. Therefore, the balance of the luminance of an image having an impact on the distinguishing of luminance by a human may possibly be destroyed by the performance of partial mapping, and thus an ability to perform global mapping of the image without destroying the balance of luminance of the image, and to adjust luminance while taking into consideration the way that the image is actually seen in the actual environment, is desired.

Illumination light during viewing affects the way the image is actually seen in the actual environment. This is due to luminance of each pixel becoming large for the user viewing the image by reflected light when the illumination light is reflected by a screen displaying the image. Thus in an environment of strong illumination light, effects occur, for example, such as decreased contrast of the part having a low luminance value, so that the image is difficult to see.

The present disclosure is developed in consideration of such circumstances, and an objective of the present disclosure is to provide an image adjustment device, an image adjustment method, and a computer readable medium that enable performance of image adjustment by tone mapping that considers the way the image is seen in the actual environment, without destroying the balance of luminance of the image.

Solution to Problem

In order to attain the aforementioned objective, an image adjustment device according to a first aspect of the present disclosure includes a tone adjustment unit configured to adjust luminance values of first image data having a first dynamic range to luminance values of second image data having a second dynamic range smaller than the first dynamic range. The tone adjustment unit assumes that the following relationship is satisfied: $L_O = D_O + Da = TD(I) + Da = TL(I)$, in which I represents a luminance value normalized to have a maximum value of one in the first image data, $D_O$ represents a luminance value normalized to have a maximum value of one in the second image data, Da represents a luminance value under ambient light during viewing, $L_O$ represents a luminance value of the second image data while taking into consideration effects of the ambient light during viewing, TD(I) represents a tone curve used for conversion, and TL(I) represents a tone curve taking into consideration the environment. The tone curve TD(I) is adjusted so that a function representing an inclination $\gamma(I)$ after converting $L_O = TL(I)$ to a double logarithmic plot is non-zero over an entire dynamic range.

In this case, the tone curve TL(I) in the tone adjustment unit may be taken to be a monotonically increasing function.

The inclination $\gamma(I)$ of at least one location in a range $1 \geq I \geq Ia$ may exceed 0.5, in which Ia represents a value of a luminance value I that satisfies $Da = TD(I) = TL(I)/2$.

A relationship $1 \geq Im \geq Ia$ may be satisfied, in which Im represents a value of I at which the inclination $\gamma(I)$ is a maximum value.

The image adjustment device may be further equipped with an illumination sensor configured to detect an intensity of the ambient light. The tone adjustment unit may calculate a luminance value Da due to the ambient light, based on the intensity of the ambient light detected by the illumination sensor and a reflectivity of a screen displaying an image, and may, in response to the luminance value Da, adjust the tone curve TD(I) so that the inclination $\gamma(I)$ is non-zero over the entire dynamic range.

The tone adjustment unit, may adjust, in response to the luminance value Da, the tone curve TD(I) and a maximum illuminance value of the second image data such that the inclination $\gamma(I)$ is non-zero over the entire dynamic range.

In this case, the image adjustment device may further include a storage configured to store a plurality of tone curves having different characteristics. The tone adjustment unit may select, from among the tone curves stored in the storage, a tone curve TD(I) having a large inclination γ(I) while taking into consideration the effects of the ambient light during viewing, at a range of luminance values for which a pixel count in the first image data is high, and may adjust the luminance values of the first image data to the luminance values of the second image data using the selected tone curve TD(I).

The image adjustment device may further include a storage configured to store a plurality of tone curves TD(I) having different characteristics. The tone adjustment unit may select, from among the tone curves TD(I) stored in the storage, a tone curve TD(I) having a large inclination γ(I) while taking into consideration the effects of the ambient light during viewing, at a range of luminance value of a region of interest of a viewer in the first image data, and may adjust the luminance values of the first image data to the luminance values of the second image data using the selected tone curve TD(I).

The image adjustment device may further include a display unit configured to display an image and an operation unit that is a man-machine interface, and while the display unit displays the tone curve TD(I), characteristics of the tone curve TD(I) may be adjustable via the operation unit.

The display unit may display the tone curve TL(I) while taking into consideration the effects of the ambient light during viewing.

The tone adjustment unit may adjust the luminance values of the first image data to the luminance values of the second image data by using image data including a region of lowest luminance value as the first image data and by using the tone curve displayed by the display unit, and the characteristics of the tone curve may be adjustable by an operational input of the operation unit while the display unit displays the second image data.

An image adjustment device according to a second aspect of the present disclosure includes: a display unit configured to display an image; an operation unit that is a man-machine interface; and a tone adjustment unit configured to adjust luminance values of first image data having a first dynamic range to luminance values of second image data having a second dynamic range. The first adjustment unit adjusts the luminance values of the first image data to the luminance values of the second image data by using a tone curve having a relationship $\log(Y)=\gamma(X) \log(X)$, in which X represents an input, and Y represents an output. The characteristics of the tone curve are adjustable via the operation unit while the display unit displays the tone curve.

An image adjustment method according to a third aspect of the present disclosure includes a tone adjustment step for adjusting luminance values of first image data having a first dynamic range to luminance values of second image data having a second dynamic range smaller than the first dynamic range. In the tone adjustment step, the following relationship is assumed to be satisfied: $L_O=D_O+Da=TD(I)+Da=TL(I)$, in which I represents a luminance value normalized to have a maximum value of one in the first image data, $D_O$ represents a luminance value normalized to have a maximum value of one in the second image data, Da represents a luminance value under ambient light during viewing, $L_O$ represents a luminance value of the second image data while taking into consideration effects of the ambient light during viewing, TD(I) represents a tone curve used for conversion, and TL(I) represents a tone curve taking into consideration the environment. The tone curve TD(I) is adjusted so that a function representing an inclination γ(I) after converting $L_O=TL(I)$ to a double logarithmic plot is non-zero over the entire dynamic range.

A non-transitory computer readable medium storing a program according to a fourth aspect of the present disclosure causes a computer to function as a tone adjustment unit configured to adjust luminance values of first image data having a first dynamic range to luminance values of second image data having a second dynamic range smaller than the first dynamic range. The tone adjustment unit assumes that the following relationship is satisfied: $LO=DO+Da=TD(I)+Da=TL(I)$, in which I represents a luminance value normalized to have a maximum value of one in the first image data, DO represents a luminance value normalized to have a maximum value of one in the second image data, Da represents a luminance value under ambient light during viewing, LO represents a luminance value of the second image data while taking into consideration effects of the ambient light during viewing, TD(I) represents a tone curve used for conversion, and TL(I) represents a tone curve taking into consideration the environment. The tone curve TD(I) is adjusted so that a function representing an inclination γ(I) after converting $LO=TL(I)$ to a double logarithmic plot is non-zero over the entire dynamic range.

Advantageous Effects of Invention

According to the present disclosure, image adjustment is performed using a tone curve for which inclination is non-zero even under conditions by which the contrast ratio declines while taking into consideration the effects of the ambient light during viewing, and thus even under conditions in which the contrast ratio is small due to the ambient light during viewing, a discrimination threshold (smallest amount of change capable of being distinguished) can be increased while reducing the incidence of black-out and white-out. As a result, image adjustment can be performed, without destroying the balance of luminance of the image, by tone mapping that takes into consideration the way the image is viewed in the actual environment.

DESCRIPTION OF EMBODIMENTS

Figure 1:
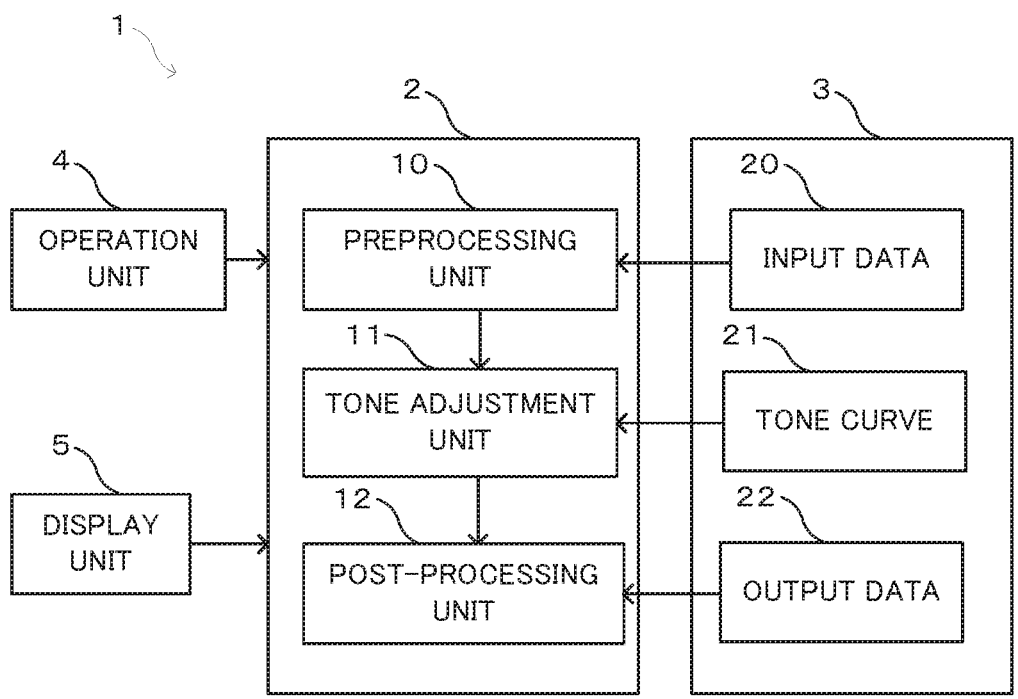
FIG. 1 is a block diagram illustrating configuration of an image adjustment device according to an embodiment of the present disclosure.

Embodiments of the present disclosure are described below in detail with reference to drawings. In the below drawings, sizes of various constituent components and positional relationships between the constituent components may differ from the actual sizes and positional relationships. In the drawings, parts that are the same or equivalent are assigned the same reference sign.

As illustrated in FIG. 1, an image adjustment device 1 is a computer, and is equipped with a controller 2 formed from a central processing unit (CPU) and memory, a storage 3 formed from components such as a hard disc, an operation unit 4 that is a man-machine interface, and a display unit 5 that is a display for displaying a screen. Due to an operational input to the operation unit 4, the controller 2 executes a program stored in the storage 3, and thereby achieves the functions of the below component elements of the image adjustment device 1. For example, an image displayed by the display unit 5 changes in accordance with operational input of the operation unit 4, and a luminance value of image data is adjusted.

The image adjustment device 1 is equipped with a preprocessing unit 10, a tone adjustment unit 11, and a postprocessing unit 12 as such component elements. Moreover, the storage 3 stores input data 20, a tone curve 21, and output data 22.

The input data 20 is video data or still image data (first image data) imaged by an imaging element. The input data 20 may be in an HDR standard image such as a tag image file format (TIFF) image or a broadcast and television receivers (BTR) standard image, or may be an SDR standard image such as a joint photographic experts group (JPEG) image or a moving picture experts group (MPEG) image. The image adjustment device 1 adjusts the luminance values of the input data 20 (first image data) having the first dynamic range to the luminance values of the output data 22 (second image data) having the second dynamic range, such as that of SDR. The output data 22 having the adjusted luminance value is stored in the storage 3. In the present embodiment, the first dynamic range is assumed to be larger than the second dynamic range, that is, the second dynamic range is assumed to be smaller than the first dynamic range.

Figure 2A:
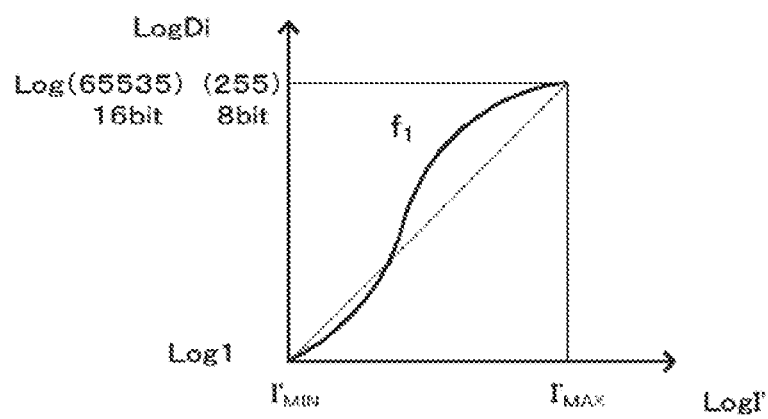
FIG. 2A is a drawing illustrating a relationship between an actual luminance of an imaging subject and a luminance of imaged image data.
Figure 2B:
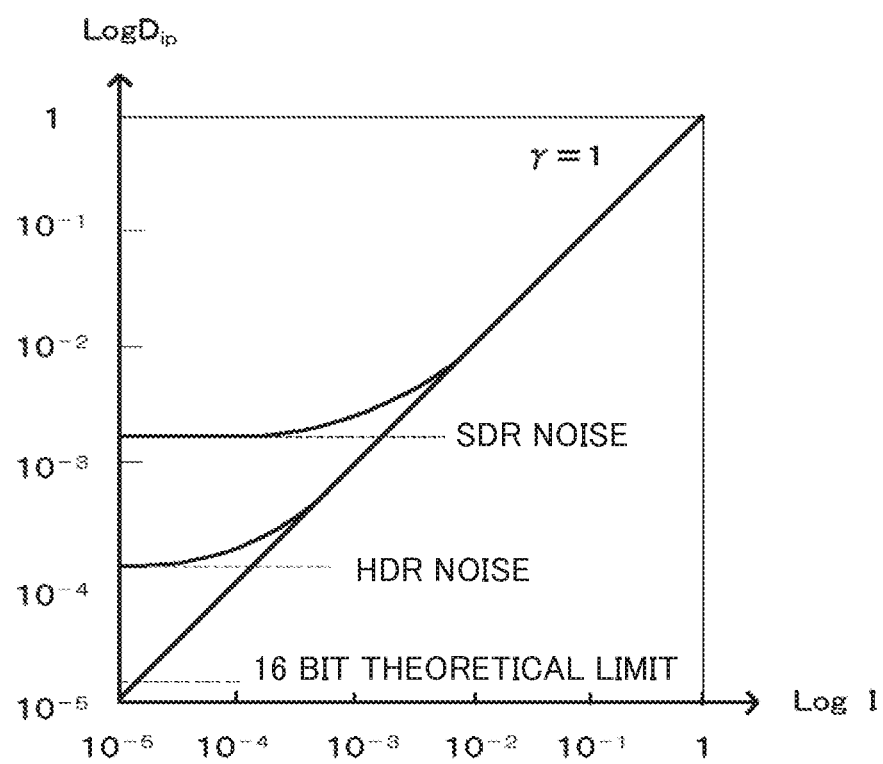
FIG. 2B is a drawing illustrating noise levels of HDR and SDR, and a theoretical limit of 16 bit.

As illustrated in FIG. 2A, for the imaging element, a relationship $\log(D_i)=f_1(\log I')$ exists between an actual luminance value $I'(I'_{MIN}\text{-}I'_{MAX})$ of the imaging subject and a luminance value $D_{ip}(\log(1)$ to $\log(255)$ in the case of 8 bit, $\log(65{,}535)$ in the case of 16 bit) of the image data (input data 20) imaged by the imaging element. The SDR image and the HDR image include noise as illustrated in FIG. 2B, and thus a limit exists to the linear relationship with the actual luminance value $I'$.

The preprocessing unit 10 performs preprocessing before the luminance adjustment of the image. Specifically, the preprocessing unit 10 reads the input data 20 from the storage 3 and performs preprocessing of the input data 20, such as by linearizing, normalizing, and correcting of the input data 20. Specifically, the preprocessing unit 10 converts the luminance value $D_i$ of each pixel of the input data 20 to the luminance value $D_{ip}$ normalized using the below-listed calculation formula.

$$D_{ip}=K \cdot f_1^{-1}(D_i)$$

In the below embodiment, this luminance value $D_{ip}$ represents the luminance value I of the first image data (input data 20).

Upon input of the luminance value I of each pixel of data preprocessed by the preprocessing unit 10, the tone adjustment unit 11 reads the tone curve 21 from the storage 3. The tone adjustment unit 11 uses the tone curve 21 to adjust the luminance value I of the read input data 20 to the luminance value $D_O$ of the output data 22.

The tone curve 21 is a curve that ahs the relationship $\log(Y)=\gamma(X)\log(X)$, in which X represents the luminance value of the preprocessed input data 20, and Y represents the luminance value of the output image data. $\gamma(X)$ is the inclination of the tone curve 21. In the present embodiment, X is the luminance value I of the preprocessed image data, and Y is the adjusted luminance value $D_O$ or the luminance value $L_O$ while taking into consideration the effects of the ambient light during viewing.

Figure 3:
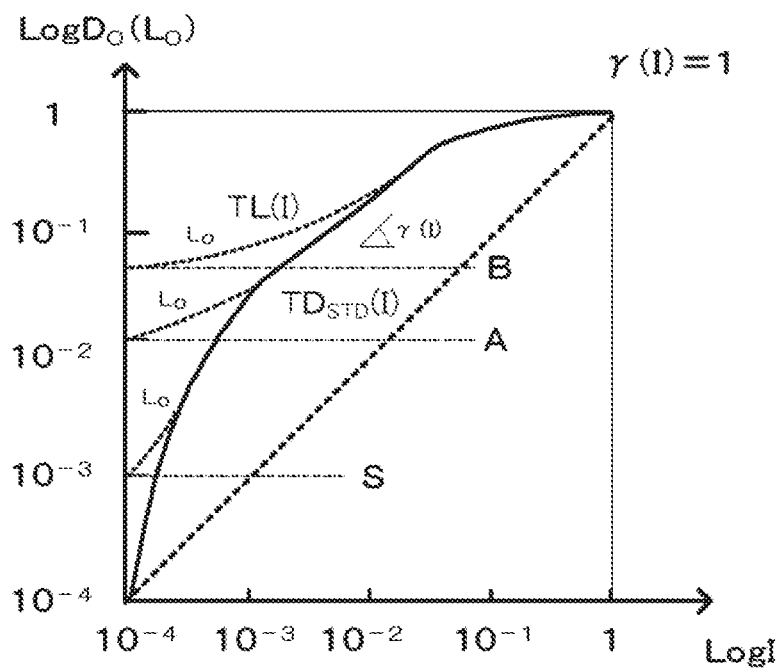
FIG. 3 is a drawing illustrating an example of a tone curve in the image adjustment device of FIG. 1.

The storage 3 stores as the tone curve 21 a tone curve $TD_{STD}(I)$ (corresponding to a below-described TD(I)) serving as a standard. As illustrated in FIG. 3, when $\log(I)$ is plotted along the horizontal axis and $\log(D_O)$ is plotted along the vertical axis, the tone curve $TD_{STD}(I)$ becomes a graph of the inclination $\gamma(I)$. The value of the inclination $\gamma(I)$ differs according to the luminance value I. For the tone curve $TD_{STD}(I)$ in the vicinity of the maximum of the luminance value (vicinity of $\log(I)=1$), the luminance value is soft clipped rather than hard clipped. That is, as the maximum of the luminance value is approached, the inclination $\gamma(I)$ becomes small. This suppresses white-out of the image.

In the present embodiment, the characteristics of the tone curve $TD_{STD}(I)$ are determined while taking into consideration of the effects of the ambient light during viewing. There are various types of environments during viewing. The effects of the ambient light are described in three examples listed below.

S: Case of brightness such as that of a dark room for viewing a movie (1,000:1)

A: Case of dark surroundings, brightness allowing reproduction of a wide dynamic range (100:1)

B: Case of normal brightness (dynamic range of 20:1)

Figure 5:
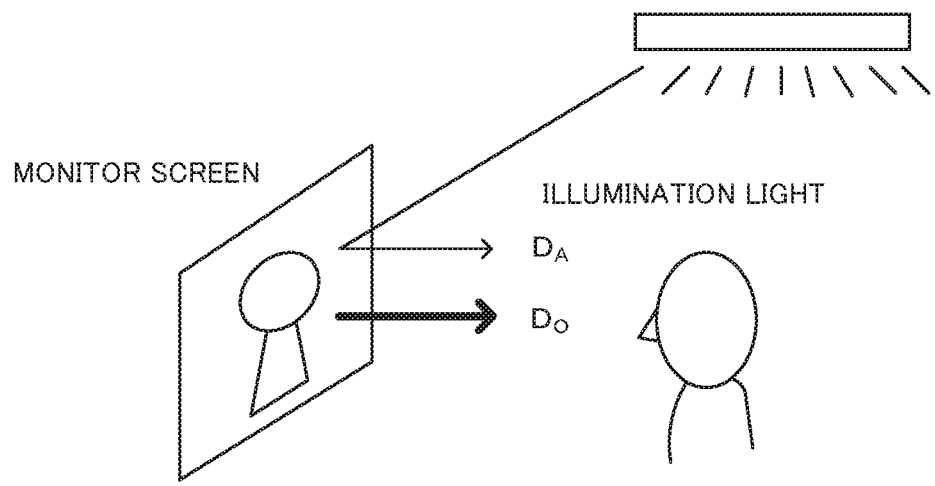
FIG. 5 is a schematic drawing illustrating how an image is actually viewed during viewing.

When the normalized luminance value I of the input data 20 is adjusted using the tone curve $TD_{STD}(I)$, the luminance value of the pixel becomes $D_O$. However, as illustrated in FIG. 5, the actual visibility of the image changes due to the effects of reflected illumination light incident on the monitor screen. That is, the luminance value of each pixel of the image becomes the luminance value $L_O$ while taking into consideration the effect on the luminance value $D_O$ of the luminance value $D_A$ due to reflection of illumination light reflected by the monitor screen. In FIG. 3, a tone curve TL(I) corresponding to the luminance value $L_O$ perceived by a person actually viewing the monitor screen is drawn using a dashed line.

In the case S, the size of the luminance value $D_A$ becomes the contrast ratio 1/1,000. In the case A, the size of the luminance value $D_A$ becomes the contrast ratio 1/100. Furthermore, in the case B, the size of the luminance value $D_A$ becomes the contrast ratio 1/20. In the image displayed on the monitor screen, the luminance becomes larger by this luminance value $D_A$.

As illustrated in FIG. 3, even for the tone curve indicated by the dashed line, the inclination $\gamma(I)$ is non-zero for the entire dynamic range, and thus a person viewing the monitor screen can recognize the image as being an image that has good contrast. The tone curve assumes a S-shape such as that of a sigmoid curve.

Figure 4:
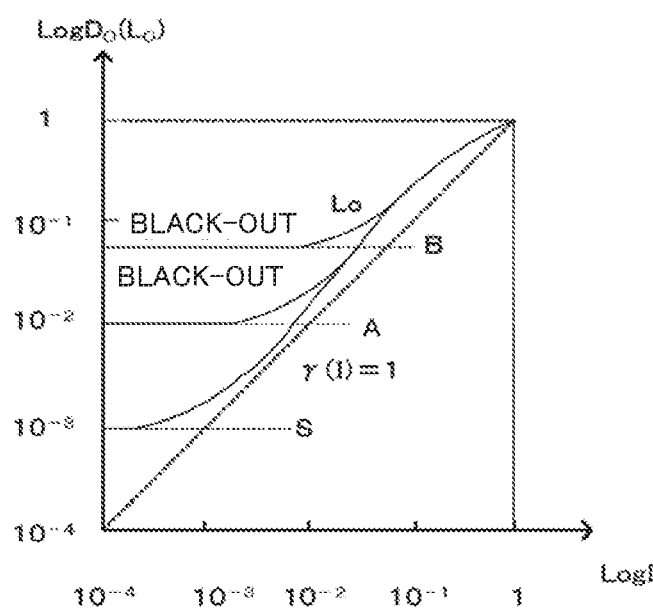
FIG. 4 is a drawing illustrating an example of a conventional tone curve.

However, if the luminance value is adjusted using the conventional tone curve without modification as illustrated in FIG. 4, the actually seen image displayed on the monitor screen is in accordance with a tone curve that has a part in which the inclination $\gamma(I)$ is zero. Therefore, the image displayed on the monitor screen is perceived as an image that has a black-out, that is, has no contrast in the black part. In contrast, the tone curve $TD_{STD}(I)$ according to the present embodiment illustrated in FIG. 3 takes into consideration the effects of the ambient light during viewing, so that $\gamma(I)$ is non-zero over the entire tone curve that is actually seen, and thus black-out is minimized.

Figure 6:
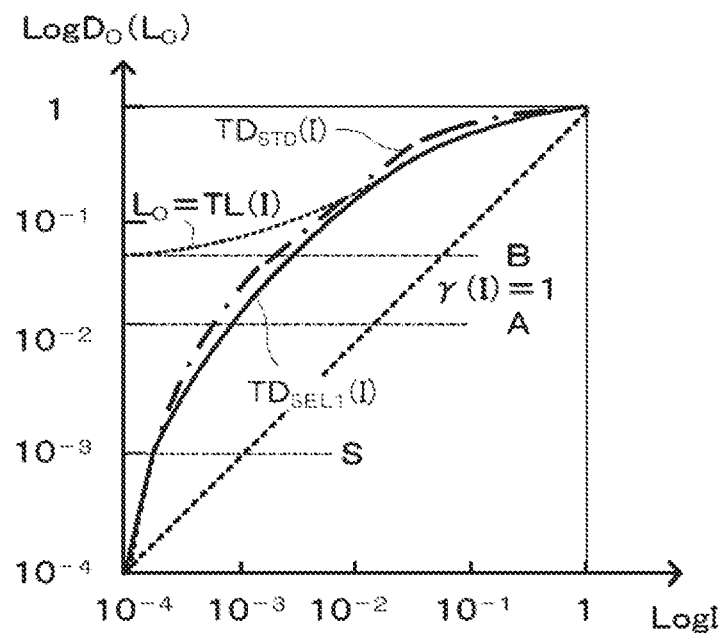
FIG. 6 is a drawing illustrating an example of a tone curve acquired in a bright environment.
Figure 7:
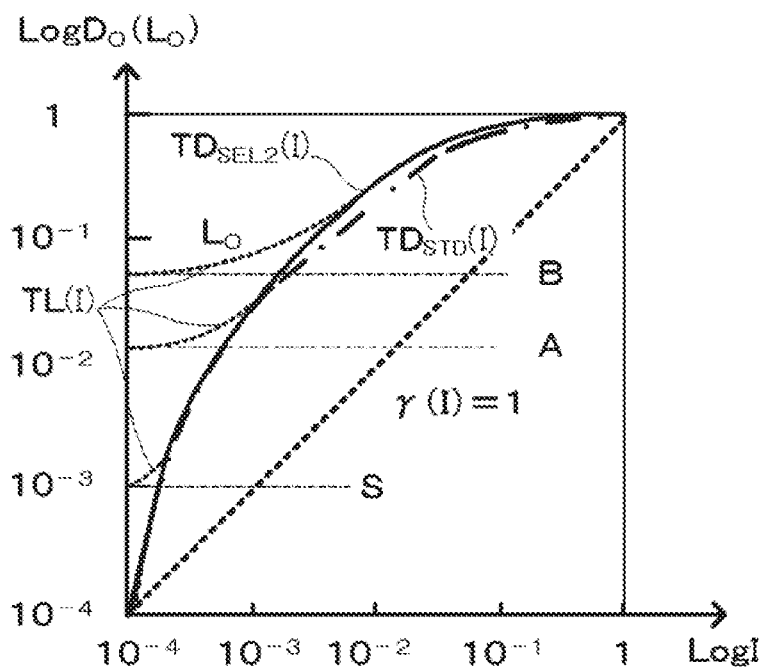
FIG. 7 is a drawing illustrating an example of a tone curve acquired in a dark environment.
Figure 8:
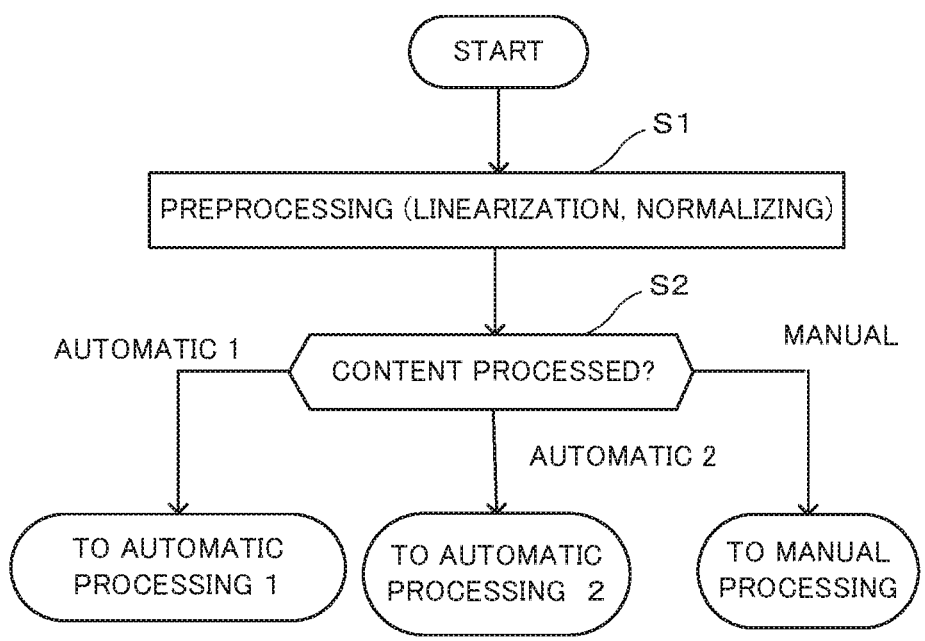
FIG. 8 is a flowchart illustrating operation of the image adjustment device according to the embodiment of the present disclosure.

In addition to the multiple tone curves $TD_{STD}(I)$ having different characteristics, that is, different curve shapes, the image adjustment device 1 also stores multiple tone curves $TD_{SEL}(I)$ as the tone curves 21. Two tone curves $TD_{SEL1}(I)$ and $TD_{SEL2}(I)$ are illustrated in FIGS. 6 and 7. In the present embodiment, these tone curves correspond to a below-described tone curve TD(I).

As illustrated in FIG. 6, when the tone curve $TD_{SEL1}(I)$ is taken to be a tone curve that takes into consideration reflection during viewing, the inclination $\gamma(I)$ at the high-illumination side is high relative to the tone curve $TD_{STD}(I)$. Therefore, the tone curve $TD_{SEL1}(I)$ is suitable for display of an image that has many pixels having a high luminance.

Moreover, as illustrated in FIG. 7, when the tone curve $TD_{SEL2}(I)$ is assumed to be a tone curve that takes into consideration reflection during viewing, the inclination $\gamma(I)$ at the low-luminance side is high relative to the tone curve $TD_{STD}(I)$. The tone curve $TD_{SEL2}(I)$ is appropriate for an image that has many pixels having relatively low luminance.

In addition to such curves, the storage 3 can store numerous tone curves $TD_{SEL}(I)$. Moreover, from among the tone curves $TD_{SEL}(I)$ stored in the storage 3, the tone adjustment unit 11 can select the tone curve $TD_{SEL}(I)$ for which the inclination $\gamma(I)$ is large while taking into consideration the effects of the ambient light during viewing within the range of luminance value for which the pixel count is large in the input data 20, and adjustment of the luminance value can be performed using the selected tone curve. At least 0.5 and no more than 1.0, for example, can be used as a maximum value of the inclination $\gamma(I)$ of this tone curve $TD_{SEL}(I)$.

The storage 3 can store as the tone curve $TD_{SEL}(I)$ a tone curve for which the inclination $\gamma(I)$ is large while taking into consideration the effects of the ambient light during viewing in the range of luminance values of a region of interest of the viewer, such as a region that a creator would like the viewer to see or a region that the viewer would like to see. From among the tone curves $TD_{SEL}(I)$ stored in the storage 3, the tone adjustment unit 11 selects the tone curve $TD_{SEL}(I)$ having a large inclination while taking into consideration the effects of the ambient light during viewing in the range of luminance values for which the pixel count is high in the input data 20, and can adjust the luminance values using the selected tone curve.

The tone curve $TD_{SEL}(I)$ in this manner is a tone curve that has a part of high inclination $\gamma(I)$ in a part when considering the reflection of illumination light. The maximum value of $\gamma(I)$ may be in the vicinity of 1. The part in which the inclination $\gamma(I)$ is high may be at a single location, or may be at multiple locations. The above-described tone curve $TD_{STD}(I)$ is a curve having two parts in which the inclination $\gamma(I)$ is high.

The image adjustment device 1, in addition, stores the tone curve for $\gamma(I)=1$ as a tone curve 21. This curve is termed the tone curve $TD_{LIN}(I)$.

Moreover, the tone adjustment unit 11 can adjust the characteristics of the tone curve 21 via the operation unit 4 while the display unit 5 displays the tone curve 21 that corresponds to a below-described tone curve TD(I). The tone curve $TD_{STD}(I)$, the tone curve $TD_{SEL}(I)$, or the tone curve $TD_{LIN}(I)$ can be used as the initial tone curve.

At this time, the display unit 5 can display the tone curve TL(I) taking into consideration the effects of the ambient light during viewing. The tone adjustment unit 11, using as input data 20 the image data of a region for which the luminance value is lowest, uses the tone curve displayed on the display unit 5 to adjust the normalized luminance value I of the input data 20 to the luminance value $D_i$ of the output data 22, and can display the output data 22 on the display unit 5.

In this state, the tone adjustment unit 11 can adjust the characteristics (inclination $\gamma(I)$) of the tone curve displayed by the display unit 5 via operational input using the operation unit 4. Due to such operation, a tone curve $TD_N(I)$ can be generated that is capable of adjusting luminance such that fine details are actually visible.

Thus the tone curve 21 becomes a tone curve in which the inclination $\gamma(I)$ is non-zero for the entire dynamic range even while taking into consideration the effects of the ambient light during viewing. In such tone curves, at least one location exists of a part at which $\gamma(I)$ is in the vicinity of 1. Due to such configuration, the occurrence of black-out of parts of low luminance value and/or the occurrence of white-out of parts of high luminance value can be decreased in the adjusted image data.

The post-processing unit 12 performs post-processing. Specifically, the post-processing unit 12 performs processing such as inverse-gamma normalization of the image data for which tone is adjusted by the tone adjustment unit 11, or adjustment to convert the format to JPEG data or MPEG data. The post-processing unit 12 stores the format-adjusted video data or image data as the output data 22 in the storage 3.

Operation (image adjustment method) of the image adjustment device 1 according to the present embodiment of the present disclosure is described next with reference mainly to the flowcharts of FIGS. 8 to 12.

Firstly, the preprocessing unit 10 performs preprocessing as described above, such as linearization and correction (step S1). Thereafter, the tone adjustment unit 11 selects processing content, and branches to the selected processing (tone adjustment step in step S2). The tone adjustment unit 11 has three types of executable processing, that is, automatic processing 1, automatic processing 2, and manual processing. The branching of the processing may be performed on the basis of operational input via the operation unit 4, or may be preset.

Automatic Processing 1

Figure 9:
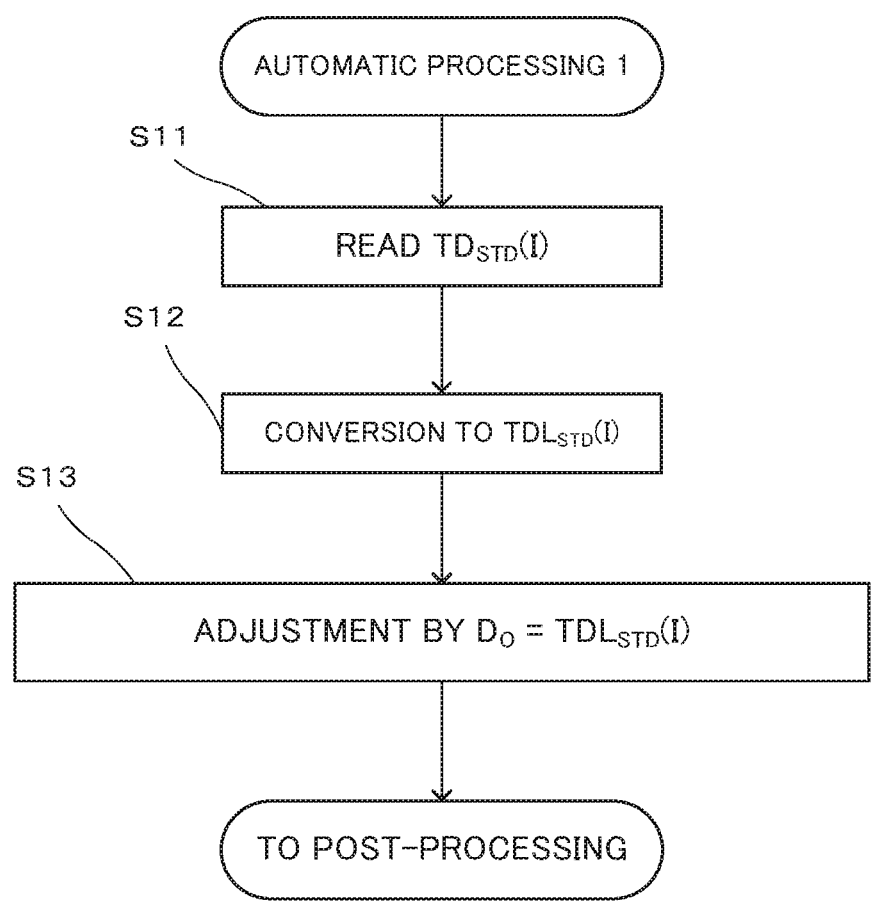
FIG. 9 is a flowchart of automatic processing 1.

In the case of selection of the automatic processing 1, as illustrated in FIG. 9, the tone adjustment unit 11 reads as the tone curve 21 the standard tone curve $TD_{STD}(I)$ (step S11). Thereafter, the tone adjustment unit 11 converts the tone curve $TD_{STD}(I)$ from the curve plotted on the logarithmic axes to the tone curve $TDL_{STD}(I)$ on the linear scale axes (step S12). Thereafter, the tone adjustment unit 11 uses the tone curve $TDL_{STD}(I)$ to adjust the luminance value I of the image data to the luminance value $D_O$ of the image data (step S13).

When the adjusted image data is displayed by the display unit 5, the luminance value of each pixel of the image, as illustrated in FIG. 5, is the luminance value $L_O$ in which the luminance value $D_A$ due to reflection of illumination light is added to the luminance value $D_O$. Therefore as illustrated in FIG. 3, even while taking into consideration the effects of the ambient light during viewing, the image data is adjusted on the basis of the tone curve 21 such that the inclination $\gamma(I)$ is non-zero for the entire dynamic range, and the image is clear and free of effects such as black-out for the viewer viewing the image.

Automatic Processing 2

Figure 10:
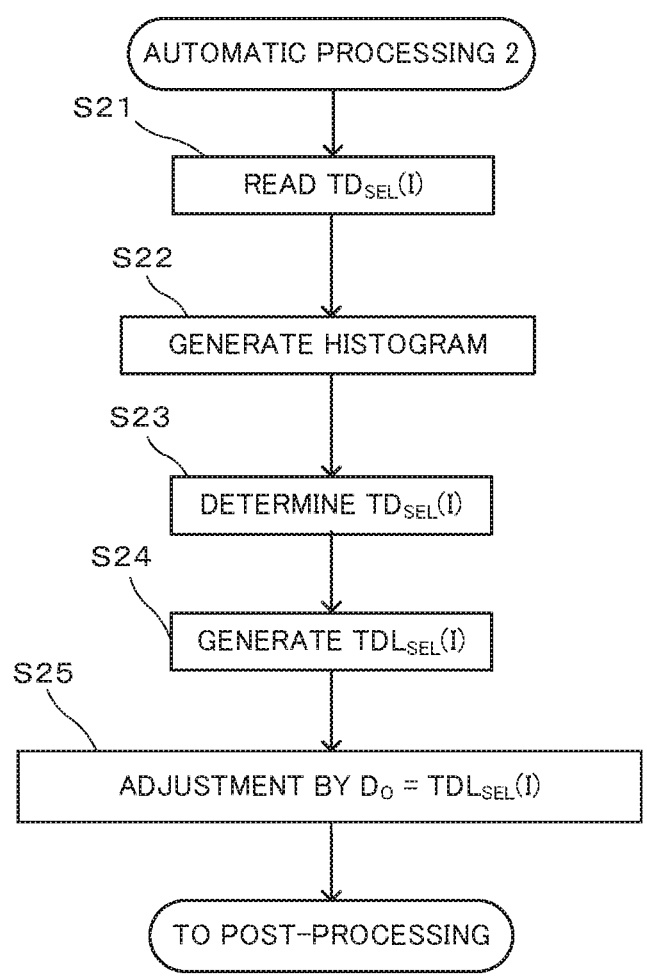
FIG. 10 is a flowchart of automatic processing 2.

In the case of selection of the automatic processing 2, as illustrated in FIG. 10, the tone adjustment unit 11 reads, as the tone curve 21, tone curves $TD_{SEL}(I)$ ($TD_{SEL1}(I)$ and $TD_{SEL2}(I)$) for which the curve shapes are different (step S21). Thereafter, the tone adjustment unit 11 generates a histogram of luminance values I for the normalized image data (step S22). Thereafter, the tone adjustment unit 11, on the basis of the generated histogram, determines the tone curve $TD_{SEL}(I)$ (step S23). If the pixel count for high luminance is high, a tone curve (for example, $TD_{SEL1}(I)$) is selected for which the inclination $\gamma(I)$ is high in the high luminance region, and if the pixel count for low luminance is high, a tone curve (for example, $TD_{SEL2}(I)$) is selected for which the inclination $\gamma(I)$ is high in the low luminance region. In the case of selection of the region of interest by designation by a person such as the viewer, the histogram of the luminance value I of the region of interest in the image data may be generated in step S22, and a tone curve $TD_{SEL}(I)$ having a high inclination $\gamma(I)$ in the range of luminance value of the region of interest corresponding to the histogram may be selected in step S23.

Thereafter, the tone adjustment unit 11 adjusts the tone curve $TD_{SEL}(I)$ from the curve on the logarithmic axes to the tone curve $TDL_{SEL}(I)$ on the real number axes (step S24). Thereafter, the tone adjustment unit 11 uses the tone curve $TDL_{SEL}(I)$ to adjust the luminance value I of each pixel to the luminance value $D_O$ (step S25).

When the adjusted image data is displayed by the display unit 5, as illustrated in FIGS. 6 and 7, the luminance value actually seen for each pixel of the image displayed on the monitor screen is the luminance value $L_O$ obtained by adding to the luminance value $D_O$ the luminance value $D_A$ due to reflection of the illumination light. Therefore, as illustrated in FIGS. 6 and 7, the resultant image data has a luminance value adjusted on the basis of the tone curve (tone curve corresponding to $L_O$) in which the inclination $\gamma(I)$ is non-zero for the entire dynamic range even while taking into consideration the effects of the ambient light during viewing, and this image is clear and free of phenomena such as black-out for the person viewing the image. Further, the characteristics of the tone curve can be made to respond to the distribution of luminance value of the image imaged by the imaging element, thereby enabling further clarity of the displayed image.

Manual Processing

Figure 11:
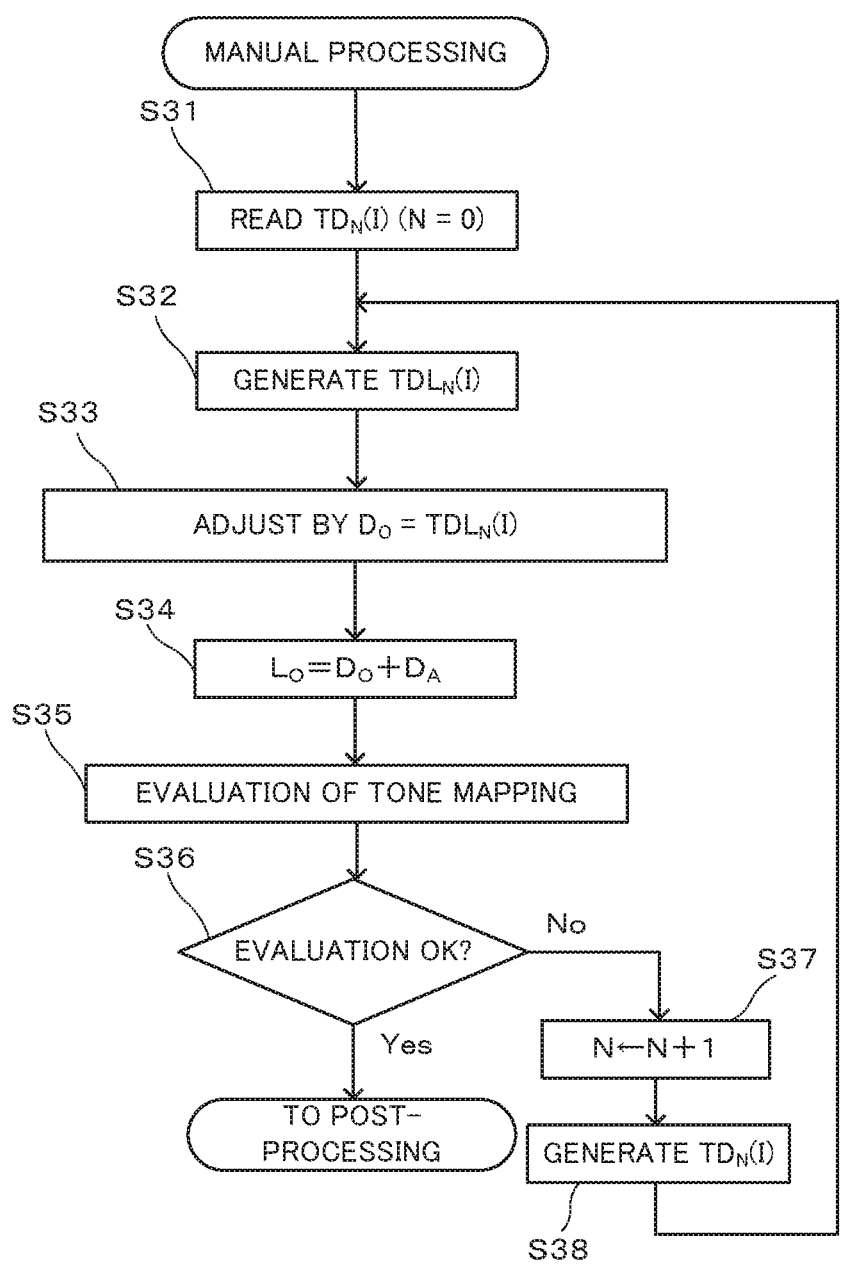
FIG. 11 is a flowchart of manual processing.

In the case of selection of manual processing, as illustrated in FIG. 11, the tone adjustment unit 11 reads, as the tone curve 21, a tone curve $TD_N(I)$ (N=0) serving as an initial value (step S31). The tone curve $TD_0(I)$ selected as the initial value may be $TD_{STD}(I)$, may be $TD_{SEL}(I)$ ($TD_{SEL1}(I)$ or $TD_{SEL2}(I)$), or may be $TD_{LIN}(I)$.

Thereafter, the tone adjustment unit 11 adjusts the tone curve $TD_N(I)$ from the curve on the logarithmic axes to the curve on the real number axes, and generates the tone curve $TDL_N(I)$ (step S32). Thereafter, the tone adjustment unit 11 uses the tone curve $TDL_N(I)$ to adjust the luminance value I of the image data to the luminance value $D_O$ of the image data (step S33).

Furthermore, the tone adjustment unit 11 calculates the luminance value $L_O$ by adding the luminance value $D_A$ due to reflection of the ambient light during viewing to the luminance value $D_O$ (step S34). The luminance value $D_A$ can be adjusted by the operational input of the operation unit 4, and for example, 1/100 can be entered in the case of A, and 1/20 can be entered in the case of B.

Thereafter, the tone adjustment unit 11 performs evaluation of tone mapping (step S35). Here, the tone adjustment unit 11 displays the image data on the display unit 5 on the basis of the calculated luminance value $D_O$, and displays the tone curve in response to the luminance value $L_O$. An evaluator looking at the display unit 5 evaluates the displayed image data.

Figure 13:
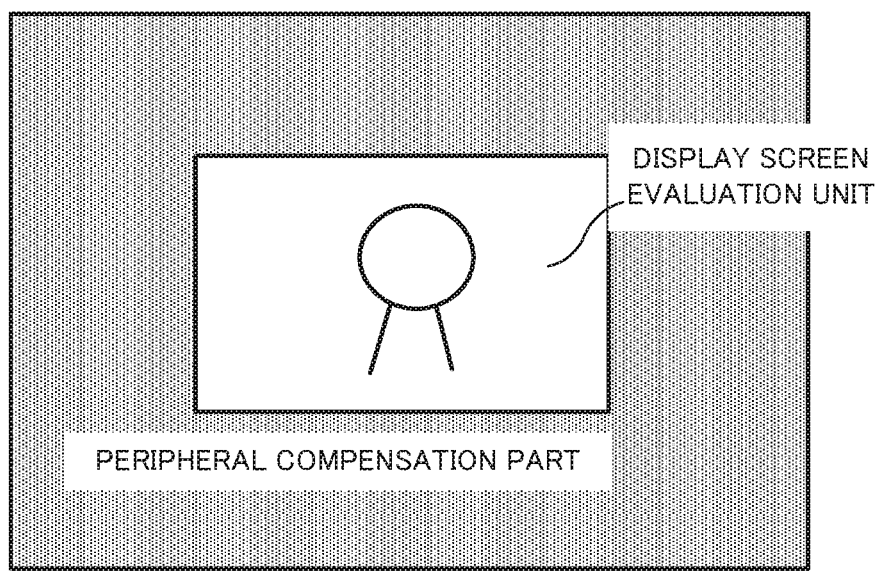
FIG. 13 is a drawing illustrating an example of image data used in manual processing.

Further, image data such as that illustrated in FIG. 13 can be used as the image data used in the evaluation. The image data illustrated in FIG. 13 is image data in which are included a peripheral compensation part that is an region of the lowest luminance value and an evaluation screen display unit. The peripheral compensation part is used for evaluation of whether the luminance value $D_A$ due to reflection of illumination light during viewing is accurate. The peripheral compensation part and the evaluation screen display unit are configured so as to give the impression of merging together when the luminance value $D_A$ is accurate.

While the tone adjustment unit 11 displays the image of the display screen evaluation unit of the output data 22 having the adjusted luminance value via the display unit 5, evaluation is performed as to whether the peripheral compensation part and the evaluation screen display part give the impression of merging together. The evaluation result of the evaluator is OK if, in the actually displayed image, the image of the evaluation screen display unit is felt to be clear, and the peripheral compensation part and the evaluation screen display unit give the impression of merging together.

The tone adjustment unit 11 determines whether the evaluation result is OK (step S36). If the evaluation result is not OK (NO in step S36), the tone adjustment unit 11 increments a counter value N by 1 (step S37). The tone adjustment unit 11 changes the tone curve $TD_N(I)$ in the aforementioned manner in accordance with the operational input of the operation unit 4, and generates a new tone curve $TD_N(I)$ (step S38).

Thereafter, the tone adjustment unit 11 repeats processing by returning to the step S32, adjusting the tone curve $TDL_N(I)$ to the real number axes (step S32), calculating the luminance value $D_O$ (step S33), calculating the luminance value $L_O$ (step S34), evaluating the tone mapping (step S35), and determining the evaluation result (step S36). When the evaluation result in step S36 is OK (YES in step S36), the image adjustment device 1 proceeds to post-processing. The tone curve $TD_N(I)$ at this time is the tone curve $TD(I)$.

Post-Processing

Figure 12:
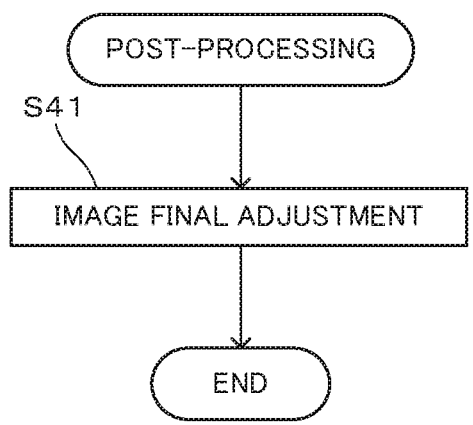
FIG. 12 is a flowchart of post-processing.

Upon the completion of the automatic processing 1, the automatic processing 2, or the manual processing, as illustrated in FIG. 12, the post-processing unit 12 performs final image adjustment as post-processing (step S41). As described above, the post-processing includes operations such as inverse gamma compensation and format conversion to JPEG or MPEG. After the completion of post-processing, processing by the image adjustment device 1 ends.

The configuration of the image adjustment device 1 of the present embodiment is summarized as follows. The image adjustment device 1 is equipped with the tone adjustment unit 11. The tone adjustment unit 11 adjusts the luminance values of the first image data having the first dynamic range to the luminance values of the second image data having the second dynamic range that is smaller than the first dynamic range. More specifically, the tone adjustment unit 11 performs adjustment of Da representing the luminance value of the ambient light during viewing, in which I represents the luminance value of the first image data normalized such that the maximum value is 1, and $D_O$ represents the luminance value of the second image data normalized such that the maximum value is 1. The tone adjustment unit 11 assumes that the following relationship is satisfied: $L_O=D_O+Da=TD(I)+Da=TL(I)$, in which $L_O$ represents a luminance value while taking into consideration effects of the ambient light during viewing, TD(I) represents a tone curve used for conversion, and TL(I) represents a tone curve taking into consideration the environment.

Figure 14:
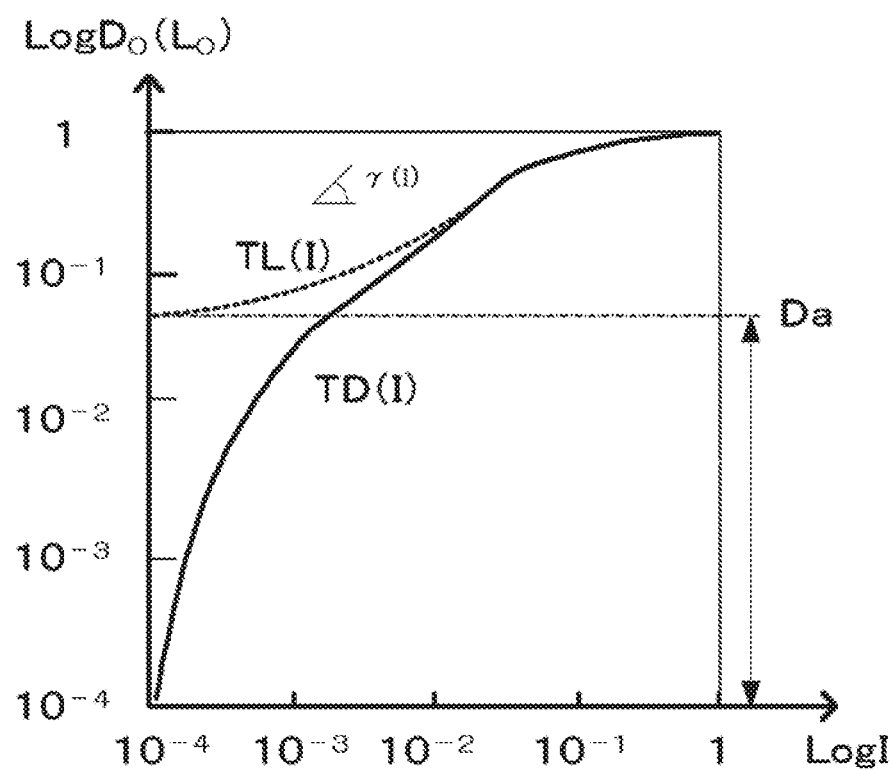
FIG. 14 is a drawing illustrating a general tone curve adjusted by the image adjustment device of FIG. 1.

The tone adjustment unit 11 sets TL(I) to a target function to a tone curve for use during adjustment, and thus the tone curve TD(I) is adjusted so that a function representing an inclination $\gamma(I)$ after converting $L_O=TL(I)$ to a double logarithmic plot is non-zero over the entire dynamic range. For example, by adjustment of the tone curve TD(I) as illustrated in FIG. 14, TL(I), which is the sum of TD(I) and Da, is a tone curve for which the inclination $\gamma(I)$ is non-zero over the entire dynamic range of $10^{-4}$ to 1. Further, in FIGS. 3, 6, and 7, $TD_{STD}(I)$, $TD_{SEL1}(I)$, and $TD_{SEL2}(I)$ correspond to TD(I), and the dashed-line curve corresponds to TL(I).

In this manner, the tone adjustment unit 11 adjusts the tone curve TL(I) while taking into consideration the effects of the ambient light. Examples of the adjusted tone curve TL(I) are illustrated in FIGS. 15 and 16.

Figure 15:
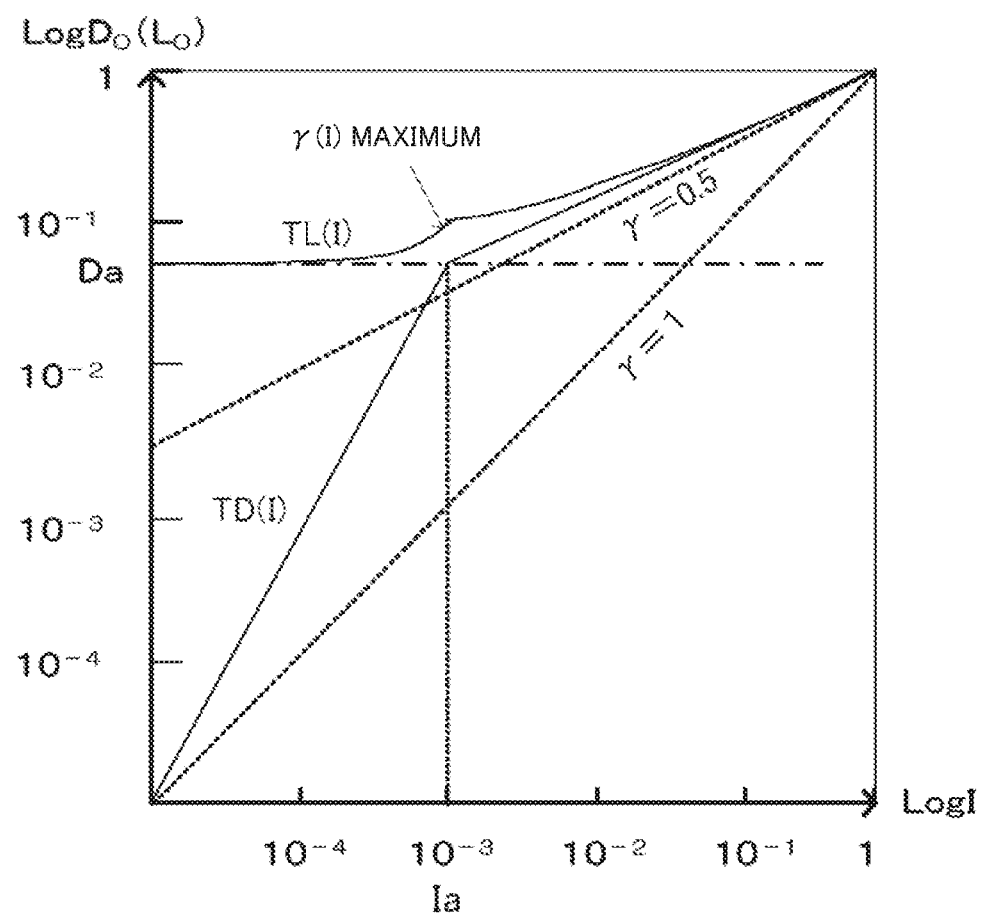
FIG. 15 is a drawing illustrating an example of an adjusted tone curve.

The tone curve TD(I) illustrated in FIG. 15, when plotted against the double logarithmic plot axes, is a line for which the inclination $\gamma(I)$ changes at the boundary I=Ia. In this case, the tone curve TL(I) is a monotonically increasing function. Reproducibility of the dark portion improves relative to the original image, in which $\gamma(I)=1$. Ia represents the value of the luminance value I that satisfies $Da=TD(I)=TL(I)/2$. In the tone curve TL(I), the luminance value I where $\gamma(I)$ has the maximum value occurs at a luminance smaller than Ia, and although tonal scale in the comparatively dark portion is emphasized, the contrast ratio in the bright portion is insufficient such that contrast is low.

Figure 16:
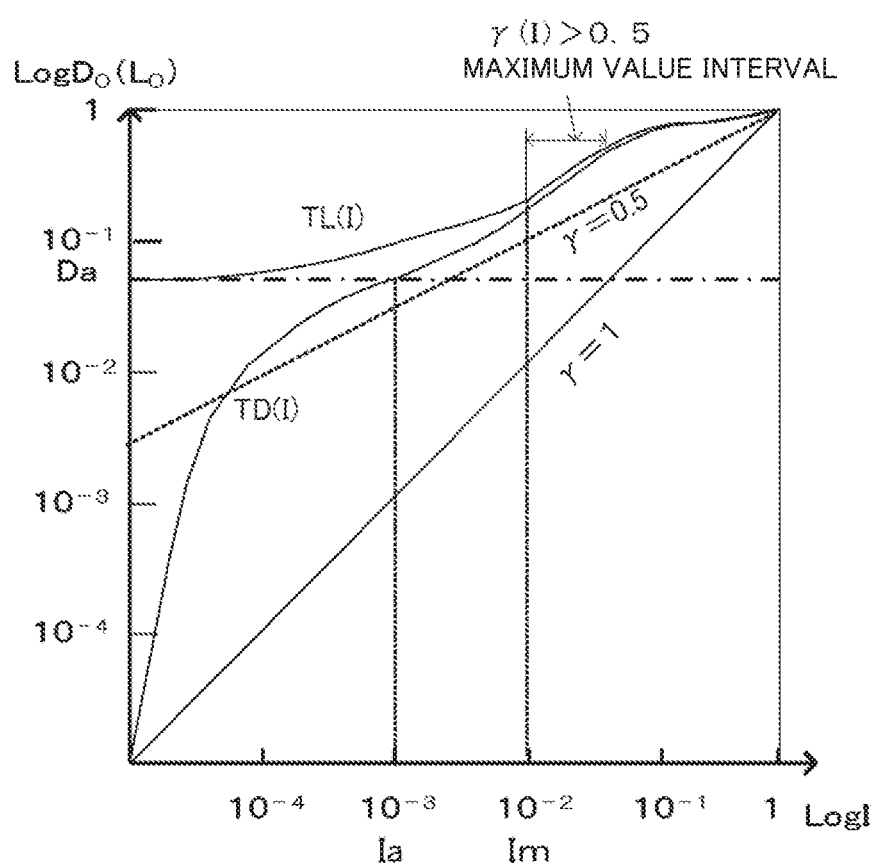
FIG. 16 is a drawing illustrating another example of an adjusted tone curve.

When the tone curve TD(I) illustrated in FIG. 16 is plotted against the double logarithm axes, the resultant curve is also a monotonically increasing function that does not have a fixed inclination $\gamma(I)$. In the tone curve TL(I), there is an interval in which the inclination $\gamma(I)$ exceeds 0.5 in at least one location in $1 \geq I \geq Ia$. Moreover, taking Im to represent the value of I at which the inclination $\gamma(I)$ of the tone curve TL(I) has the maximum value, the relationship $1 \geq Im \geq Ia$ is satisfied. Thus the tone curve TL(I) is a function such that a location of a maximum exists in any portion of highlighting from intermediate tones in which the effect of the ambient light is relatively low. Use of this tone curve TL(I) enables conversion from the HDR image to the SDR image in a more visually satisfying manner.

As explained above in detail, due to the performing of image adjustment using the tone curve 21 for which the inclination $\gamma(I)$ is non-zero even under conditions of decreased contrast while taking into consideration the effects of reflection of the ambient light during viewing, the present disclosure enables an increase in the discrimination threshold (minimum amount of discernable change) even under conditions of decreased contrast while taking into consideration the effects of reflection of the ambient light during viewing, while decreasing black-out and/or white-out. Therefore, image adjustment can be performed by tone mapping that takes into consideration viewing by a human being, without loss of balance of luminance of the image.

Figure 17:
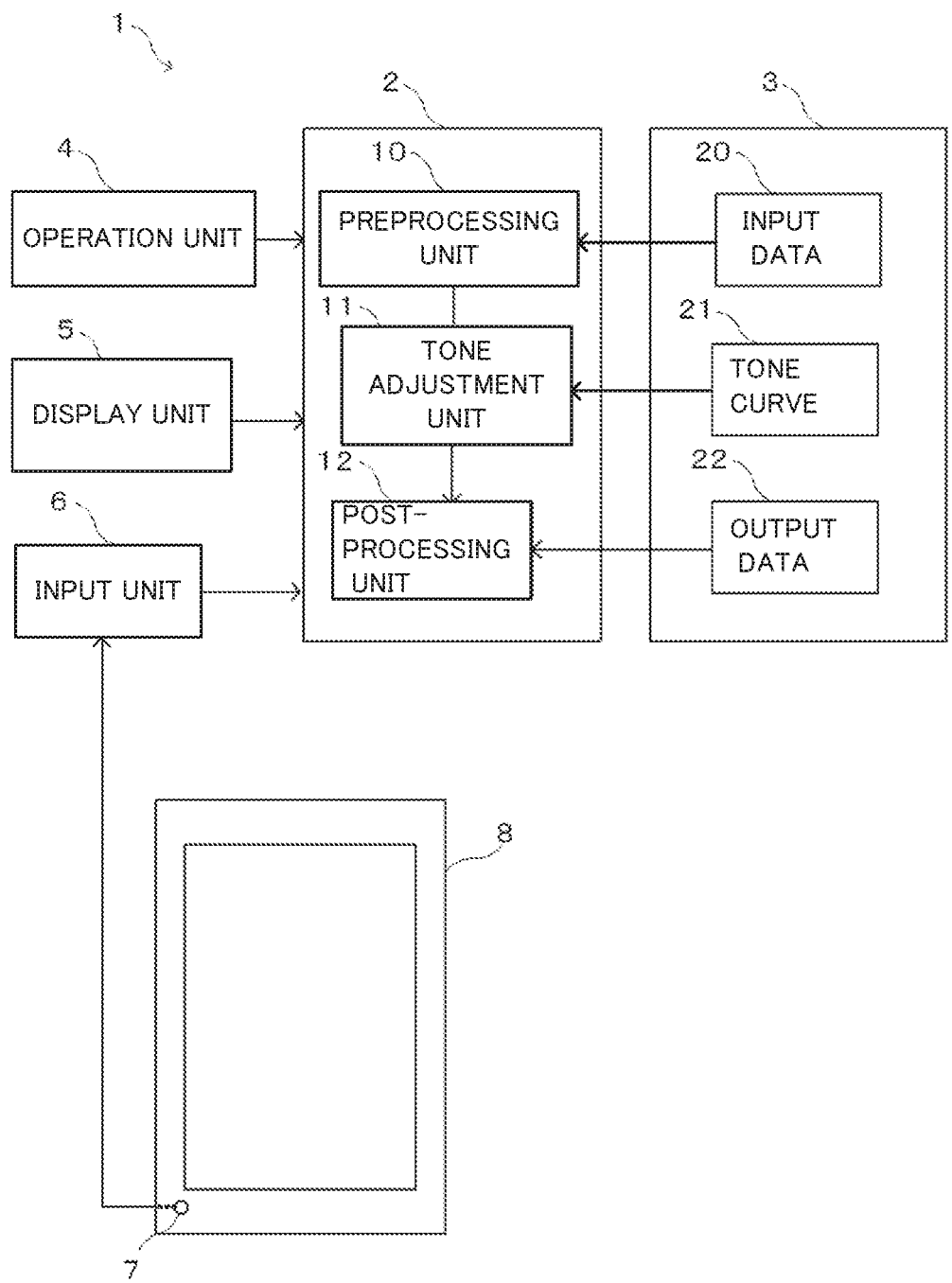
FIG. 17 is a block diagram illustrating configuration of an image adjustment device according to another embodiment of the present disclosure.

In another embodiment as illustrated in FIG. 17, the image adjustment device 1 may adjust an image displayed on a specific display 8. The illumination sensor 7 is attached to an outer frame of the display 8, and the intensity of the ambient light incident on the screen of the display 8 can be detected by the illumination sensor 7. The image adjustment device 1 is further equipped with the illumination sensor 7 and an input unit 6 for input of a sensor output from the illumination sensor 7.

Figure 18:
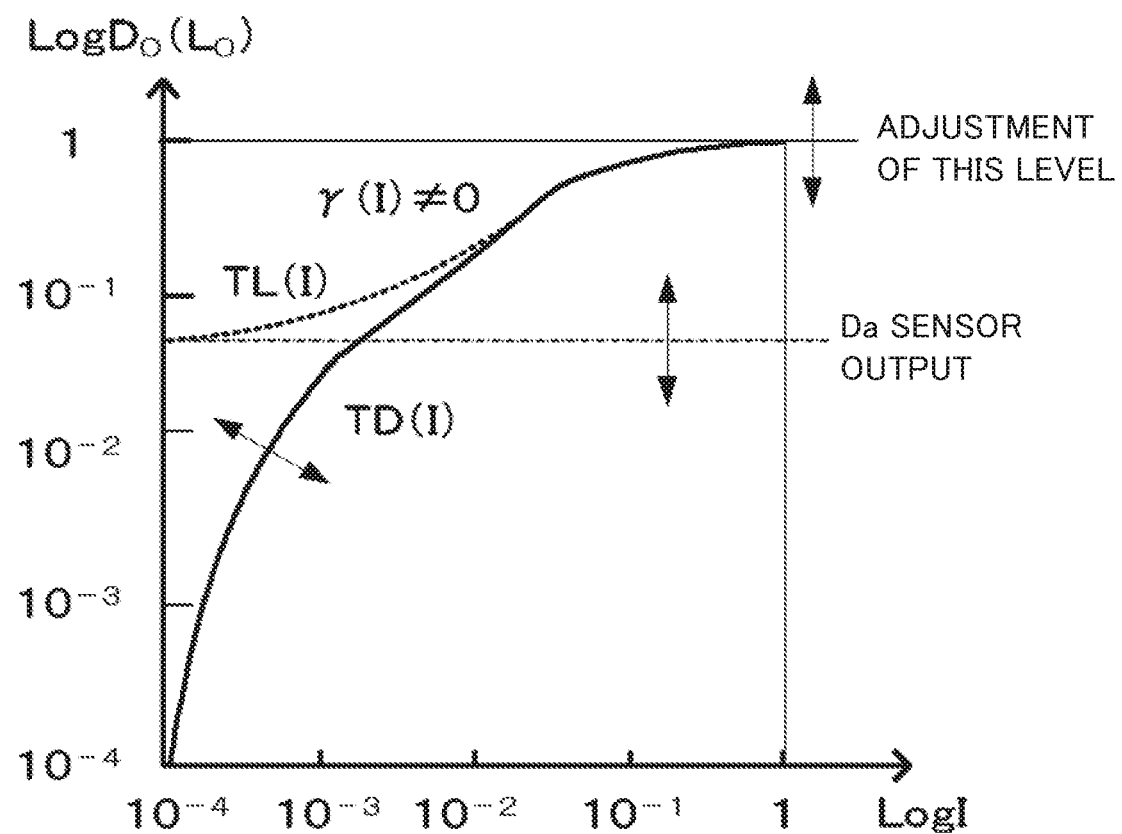
FIG. 18 is a drawing illustrating a general tone curve adjusted by the image adjustment device of FIG. 17.

The tone adjustment unit 11 calculates the luminance value Da due to the ambient light as effectively lowest luminance information of the screen of the display 8 on the basis of an intensity of the ambient light detected by the illumination sensor 7 and a reflectivity of the display 8 displaying the image. Although accurate calculation is possible using a predetermined value for the reflectivity, a standard value may also be used. Then as illustrated in FIG. 18, the tone adjustment unit 11, in response to the calculated luminance value Da, adjusts the tone curve TD(I) such that the inclination $\gamma(I)$ of the tone curve TL(I) is non-zero in the entire dynamic range. Such operation enables the performing of image conversion using a suitable tone curve TL(I) every time, even when the intensity of the ambient light changes, thereby always enabling the display of an image that is easily viewed.

At this time as illustrated in FIG. 18, the tone adjustment unit 11 may perform adjustment, in response to the luminance value Da, by raising or lowering a maximum luminance value of second image data (maximum value where $D_O$ is 1 on the vertical axis) together with the tone curve TD(I) such that the inclination $\gamma(I)$ is non-zero over the entire dynamic range. For example, as the luminance value Da increases, the maximum luminance value of the second image data may be increased. Due to operation in this manner, even when a change occurs in the ambient light such as when going from a dark room to a room of intermediate brightness, the effective luminance contrast ratio and tonal scale characteristics can be maintained at nearly constant values. Therefore, an effect can be anticipated that is the ability to prevent the luminance contrast ratio from becoming greater than necessary such that easy visibility is impaired. Moreover, even when the ambient light becomes extremely bright such that the maximum level cannot be adjusted, by adjusting just the tone curve TD(I), a tonal scale can be expressed that is more appropriate than selection even among the limited luminance contrast ratios.

Moreover, in accordance with the aforementioned embodiments, the image can be adjusted by, among the multiple tone curves, selection of the tone curve 21 having a large inclination $\gamma(I)$ while taking into consideration the effects of the ambient light during viewing in the range of luminance values for which the pixel count is high or selection of the tone curve 21 for which the inclination $\gamma(I)$ is large while taking into consideration the ambient light during viewing in the range of luminance values of the region of interest of the viewer. Due to such operation, even under conditions of decreased contrast ratio due to the overall effects of the ambient light during viewing, the contrast can be further increased in regions of importance of the image, while reducing the incidence of black-out and white-out.

Moreover, heretofore when the tone curve 21 is adjusted by manual processing, the displayed tone curve is adjusted by a manual operation while the tone curve is displayed such that the pixel values of the γ-corrected (normally γ=2.2 to 2.4) image data or the real number values of the luminance value are plotted on the horizontal axis (X axis) and vertical axis (Y axis). Even when the tone curve of real number values on both axes is used, in the case when pixel values of 8 bit image data γ-corrected as in a general SDR image is input, dynamic range is relatively narrow in comparison to HDR, and therefore differences relative to the visual characteristics approximating those of a human being are not large, and tone mapping is not greatly problematic. However, the dynamic range of the HDR image is broad, and thus when the tone curve is used that plots real number values on both axes, a problem of operability arises in that detailed performance of operations in the low luminance portion is problematic. Thus by use of the image adjustment device 1 in accordance with the present embodiment, during manual processing, the tone curve 21 can be adjusted via the operation unit 4 while the display unit 5 displays the tone curve 21 in which the logarithms of the luminance values are plotted on both the horizontal and vertical axes. The visual characteristics of a human being are expressed linearly when plotted on near-logarithmic axes rather than linearly-scaled axes (Weber-Fechner law), and therefore the use of the tone curve 21 that is displayed using the double logarithmic axes enables the performance of the correction of luminance values of the image under conditions approaching those of the human visual sense (visual characteristics).

Further, in the case in which the input data 20 is video data, the tone curve may be changed each time there is a switching of the video between scenes.

Although the image adjustment device 1 according to the aforementioned various embodiments adjusts the image data displayed on the display, the present disclosure is not limited to such operation. The present disclosure can be used also for adjusting the luminance value of image data displayed as a photograph or a printed item. For example, the present disclosure can be used appropriately for preprocessing or overall processing of tone mapping during media conversion, such as when converting an image displayed on a display to a printed item.

Although a step of recording the program for performing the operations of the aforementioned various embodiments is processing performed in a time series in accordance with the order of recording, the processing is not necessarily processing of a time series, and processing is included that is executed in parallel or independently.

In each of the above-described embodiments, the term "system" indicates a device including multiple devices or an entirety of functions included in the multiple functions.

The hardware configuration and/or software configuration of the image adjustment device 1 is an example and can be freely modified and amended.

The parts performing the central processing of the image adjustment device 1 including components such as the controller 2 and the storage 3 are not necessarily achieved using a dedicated system, but rather can be achieved by using a normal computer system. For example, a computer program for executing the above-described operations can be stored and distributed on a computer-readable storage medium such as a flexible disc, CD-ROM, DVD-ROM, or the like, and the image adjustment device 1 may be configured by installing the computer program on a computer and executing the above-described processing. Moreover, the computer program may be contained in a recording device possessed by a server device on a communication network such as the Internet, and the image adjustment device 1 may be configured by means such as downloading by a normal computer system.

In the case in which the functions of the image adjustment device 1 are divided among an operating system (OS) and an application program, or in the case in which the functions are executed in cooperation between the OS and the application program, storage of the application program alone in the recording medium or storage is permissible.

The computer program may be superimposed on a carrier wave, and then may be distributed via a communication network. For example, the program may be posted to a bulletin board system (BBS) on a communication network, and the program may be distributed via the network. Further, a configuration may be used such that the aforementioned processing can be executed by starting and executing the program under control of the OS in the same manner as other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2017-99165, filed on May 18, 2017, the entire disclosure of which is incorporated by reference herein.

INDUSTRIAL APPLICABILITY

The present disclosure can be used for the display of an image in various types of environments.

REFERENCE SIGNS LIST

1 Image adjustment device
2 Controller
3 Storage
4 Operation unit
5 Display unit
6 Input unit
7 Illumination sensor
8 Display
10 Preprocessing unit
11 Tone adjustment unit
12 Post-processing unit
20 Input data (first image data)
21 Tone curve
22 Output data (second image data)

The invention claimed is:

1. An image adjustment device comprising:
a tone adjustment unit configured to adjust luminance values of first image data having a first dynamic range to luminance values of second image data having a second dynamic range smaller than the first dynamic range, wherein the tone adjustment unit assumes that the following relationship is satisfied: LO=DO+Da=TD(I)+Da=TL(I), in which I represents a luminance value normalized to have a maximum value of one in the first image data, DO represents a luminance value normalized to have a maximum value of one in the second image data, Da represents a luminance value under ambient light during viewing, LO represents a luminance value of the second image data while taking into consideration effects of the ambient light during viewing, TD(I) represents a tone curve used for conversion, and TL(I) represents a tone curve taking into consideration the environment, and the tone curve TD(I) is adjusted so that a function representing an inclination γ(I) after converting LO=TL(I) to a double logarithmic plot is non-zero over an entire dynamic range.

2. The image adjustment device according to claim 1, wherein the tone curve TL(I) in the tone adjustment unit is a monotonically increasing function.

3. The image adjustment device according to claim 2, wherein the inclination γ(I) of at least one location in a range 1≥I≥Ia exceeds 0.5, in which Ia represents a value of a luminance value I that satisfies Da=TD(I)=TL(I)/2.

4. The image adjustment device according to claim 2, wherein a relationship 1≥Im≥Ia is satisfied, in which Im represents a value of I at which the inclination γ(I) is a maximum value.

5. The image adjustment device according to claim 1, further comprising:

an illumination sensor configured to detect an intensity of the ambient light, wherein the tone adjustment unit calculates a luminance value Da due to the ambient light, based on the intensity of the ambient light detected by the illumination sensor and a reflectivity of a screen displaying an image, and in response to the luminance value Da, adjusts the tone curve TD(I) so that the inclination γ(I) is non-zero over the entire dynamic range.

6. The image adjustment device according to claim 5, wherein the tone adjustment unit adjusts, in response to the luminance value Da, the tone curve TD(I) and a maximum illuminance value of the second image data such that the inclination γ(I) is non-zero over the entire dynamic range.

7. The image adjustment device according to claim 1, further comprising:

a storage configured to store a plurality of tone curves having different characteristics, wherein the tone adjustment unit (i) selects, from among the tone curves stored in the storage, a tone curve TD(I) having a large inclination γ(I) while taking into consideration the effects of the ambient light during viewing, at a range of luminance values for which a pixel count in the first image data is high, and (ii) adjusts the luminance values of the first image data to the luminance values of the second image data using the selected tone curve TD(I).

8. The image adjustment device according to claim 1, further comprising:

a storage configured to store a plurality of the tone curve TD(I) having different characteristics, wherein the tone adjustment unit (i) selects, from among the tone curves TD(I) stored in the storage, a tone curve TD(I) having a large inclination γ(I) while taking into consideration the effects of the ambient light during viewing, at a range of luminance value of a region of interest of a viewer in the first image data, and (ii) adjusts the luminance values of the first image data to the luminance values of the second image data using the selected tone curve TD(I).

9. The image adjustment device according to claim 1, further comprising:

a display unit configured to display an image; and an operation unit that is a man-machine interface, wherein while the display unit displays the tone curve TD(I), characteristics of the tone curve TD(I) are adjustable via the operation unit.

10. The image adjustment device according to claim 9, wherein the display unit displays the tone curve TL(I) while taking into consideration the effects of the ambient light during viewing.

11. The image adjustment device according to claim 10, wherein the tone adjustment unit adjusts the luminance values of the first image data to the luminance values of the second image data by using image data including a region of lowest luminance value as the first image data and by using the tone curve displayed by the display unit, and the characteristics of the tone curve are adjustable by an operational input of the operation unit while the display unit displays the second image data.

12. An image adjustment device comprising:

a display unit configured to display an image;

an operation unit that is a man-machine interface; and a tone adjustment unit configured to adjust luminance values of first image data having a first dynamic range to luminance values of second image data having a second dynamic range, wherein the tone adjustment unit adjusts the luminance values of the first image data to the luminance values of the second image data by using a tone curve having a relationship log(Y)=γ(X)log(X), in which X represents an input, and Y represents an output, and the characteristics of the tone curve are adjustable via the operation unit while the display unit displays the tone curve.

13. An image adjustment method comprising:

a tone adjustment step for adjusting luminance values of first image data having a first dynamic range to luminance values of second image data having a second dynamic range smaller than the first dynamic range, wherein in the tone adjustment step, the following relationship is assumed to be satisfied: LO=DO+Da=TD(I)+Da=TL(I), in which I represents a luminance value normalized to have a maximum value of one in the first image data, DO represents a luminance value normalized to have a maximum value of one in the second image data, Da represents a luminance value under ambient light during viewing, LO represents a luminance value of the second image data while taking into consideration effects of the ambient light during viewing, TD(I) represents a tone curve used for conversion, and TL(I) represents a tone curve taking into consideration the environment, and in the tone adjustment step, the tone curve TD(I) is adjusted so that a function representing an inclination γ(I) after converting LO=TL(I) to a double logarithmic plot is non-zero over the entire dynamic range.

14. A non-transitory computer readable medium storing a program for causing a computer to function as:

a tone adjustment unit configured to adjust luminance values of first image data having a first dynamic range to luminance values of second image data having a second dynamic range smaller than the first dynamic range, wherein the tone adjustment unit assumes that the following relationship is satisfied: $LO=DO+Da=TD(I)+Da=TL(I)$, in which I represents a luminance value normalized to have a maximum value of one in the first image data, DO represents a luminance value normalized to have a maximum value of one in the second image data, Da represents a luminance value under ambient light during viewing, LO represents a luminance value of the second image data while taking into consideration effects of the ambient light during viewing, TD(I) represents a tone curve used for conversion, and TL(I) represents a tone curve taking into consideration the environment, and the tone curve TD(I) is adjusted so that a function representing an inclination $\gamma(I)$ after converting $LO=TL(I)$ to a double logarithmic plot is non-zero over the entire dynamic range.

* * * * *